United States Patent [19]

Seki et al.

[11] Patent Number: 5,008,806
[45] Date of Patent: Apr. 16, 1991

[54] METHOD OF CREATING NC DATA FOR MACHINING CURVED SURFACES

[75] Inventors: Masaki Seki; Koji Samukawa; Osamu Hanaoka, all of Tokyo, Japan

[73] Assignee: Fanuc Ltd, Minamitsuru, Japan

[21] Appl. No.: 290,288

[22] PCT Filed: Apr. 20, 1988

[86] PCT No.: PCT/JP88/00386
§ 371 Date: Dec. 12, 1988
§ 102(e) Date: Dec. 12, 1988

[87] PCT Pub. No.: WO88/08560
PCT Pub. Date: Nov. 3, 1988

[30] Foreign Application Priority Data

Apr. 21, 1987 [JP] Japan .................................. 62-98151

[51] Int. Cl.$^5$ .................. G05B 19/42; G06F 15/46
[52] U.S. Cl. .......................... 364/191; 364/474.29;
364/474.25
[58] Field of Search ........................... 364/191–193,
364/474–474.37

[56] References Cited

U.S. PATENT DOCUMENTS

| 4,546,427 | 10/1985 | Kishi et al. | 364/474.29 |
| 4,569,014 | 2/1986 | Kishi et al. | 364/474.29 |
| 4,589,062 | 5/1986 | Kishi et al. | 364/474.29 |
| 4,755,927 | 7/1988 | Kishi et al. | 364/474.29 |
| 4,825,377 | 4/1987 | Seki et al. | 364/474.29 |
| 4,855,926 | 8/1989 | Seki et al. | 364/474.25 |
| 4,855,927 | 8/1989 | Seki et al. | 364/474.25 |
| 4,868,761 | 9/1989 | Hayashi | 364/474.29 |

Primary Examiner—Jerry Smith
Assistant Examiner—Jim Trammell
Attorney, Agent, or Firm—Staas & Halsey

[57] ABSTRACT

The invention relates to an NC data creation method for machining a curved surface (101) having a cutting boundary surface (102) in the depth direction. Data specifying the three-dimensional curved surface (101) and the curved surface (102) of a cutting boundary in the depth direction are inputted. When the three-dimensional curved surface (101) is defined by a set of a plurality of point-sequence paths (11i), a point sequence Q(i,j) of a tool nose corresponding to a point sequence A(i,j) is determined. Next, there is determined a projected point sequence B'(i,j) obtained by projecting the point sequence Q(i,j) of the tool nose onto a reference plane (103), as well as a projected point sequence C(i,j) obtained by projecting the first-mentioned projected point sequence onto the curved surface (102) of the cutting boundary. Thereafter, a check is performed to see whether a line segment connecting the point sequence Q(i,j) of the tool nose and a line segment connecting the projected point sequence C(i,j) on the curved surface of the cutting boundary intersect. If they do intersect, NC data up to the point of intersection P(i,j) are created. NC data are subsequently created in the same manner upon performing a pick-feed.

3 Claims, 6 Drawing Sheets

METHOD OF CREATING NC DATA FOR MACHINING CURVED SURFACES

DESCRIPTION

1. Technical Field

This invention relates to a method of creating NC data for machining curved surfaces. More particularly, the invention relates to a method of creating NC data for machining a curved surface having a cutting boundary surface in the depth direction.

2. Background Art

In the numerically controlled machining of a three-dimensional mold or the like, a curved surface is defined by a plurality of section curves, a point sequence is generated on the curved surface from data such as that indicative of the section curves, data relating to the generated point sequence on the curved surface are stored on an NC tape, and machining of the curved surface is executed by commands from the NC tape.

When a curved surface is defined from data (section curve data) on a mold design drawing and the entire region of the generated curved surface is machined, there are cases where a neighboring surface is cut into or where, conversely, an excessively large vacant cutting path is generated, leading to waste in terms of machining.

Consequently, a method has been developed for use when machining a curved surface 101, as shown in FIG. 6. The method includes designating a cutting boundary 105 in the depth direction in a plane 104 located at a height $Z_H$ from an X-Y plane, outputting a machining point sequence $P_i$ (i=1, 2, ...) up to the cutting boundary, thereby creating NC data, and subsequently creating NC data in the same manner upon performing a pick-feed. It should be noted that whether the point sequence $P_i$ has reached the cutting boundary 105 is determined based on whether the Z coordinate of the point sequence $P_i$ has become less than $Z_H$.

When a curved surface 101' is machined, as shown in FIG. 7, there are times when it is desired to prevent cut-in by adopting a curved surface 104' as a cutting boundary surface in the cutting direction. For example, there are cases where a TV frame is cut on the curved surface of a cathode ray tube. In cases such as these, machining in accordance with the prior art is difficult.

SUMMARY OF THE INVENTION

Accordingly, an object of the present invention is to provide a method of creating NC data for machining curved surfaces in which any curved surface is adopted as a cutting boundary surface in the depth direction.

The present invention relates to an NC data creation method for machining a curved surface having a cutting boundary surface in the depth direction.

Data specifying a three-dimensional curved surface and a curved surface of a cutting boundary in the depth direction are inputted. When the three-dimensional curved surface is defined by a set of a plurality of point-sequence paths, a point sequence Q(i,j) of a tool nose corresponding to a point sequence A(i,j) is determined. Next, there is determined a projected point sequence B'(i,j) obtained by projecting the point sequence Q(i,j) of the tool nose onto a reference plane, as well as a projected point sequence C(i,j) obtained by projecting the first-mentioned projected point sequence onto the curved surface of the cutting boundary. Thereafter, a check is performed to see whether a line segment connecting the point sequence Q(i,j) of the tool nose and a line segment connecting the projected point sequence C(i,j) on the curved surface of the cutting boundary intersect. If they do intersect, NC data up to the point of intersection P(i,j) are created. NC data are subsequently created in the same manner upon performing a pick-feed.

DESCRIPTION OF THE PREFERRED EMBODIMENT

Figure 1:
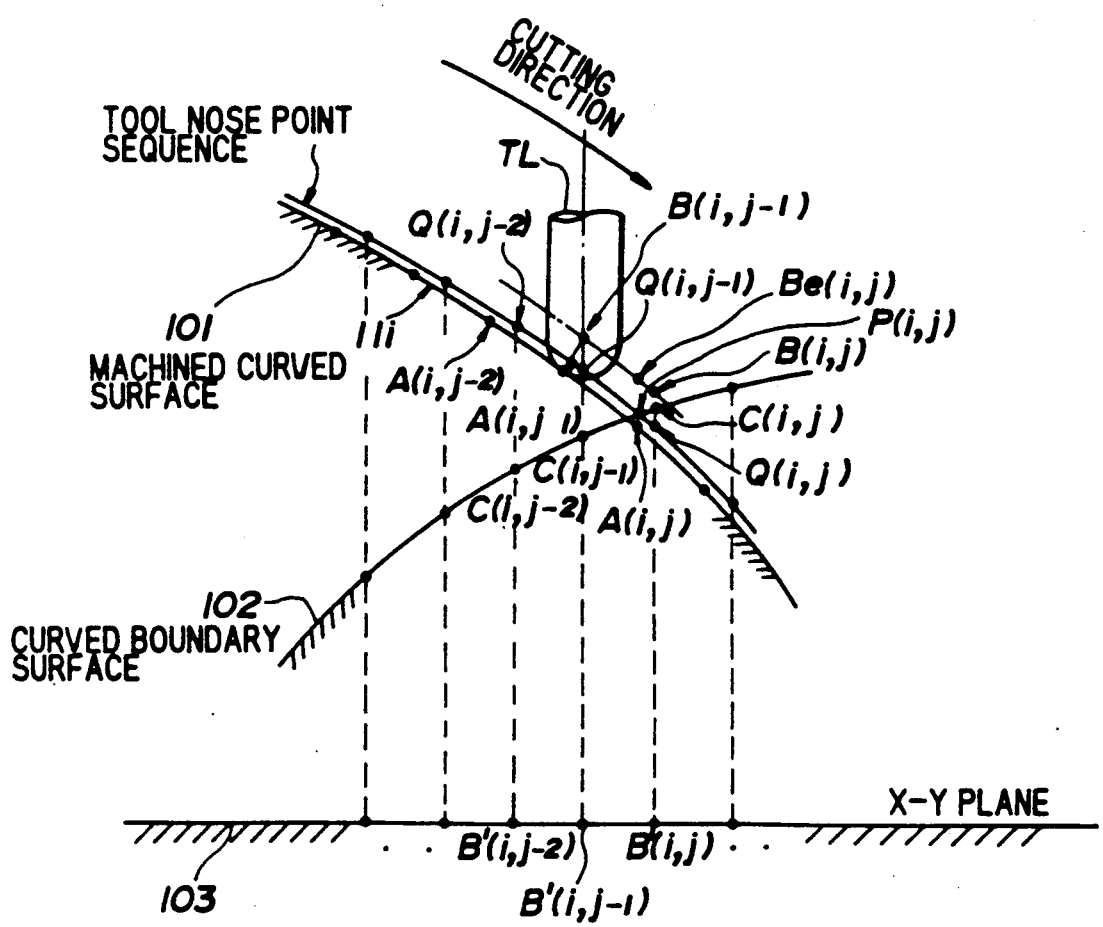
FIG. 1 is a view for describing the general features of the present invention.

FIG. 1 is a view for describing the general features of a method of creating NC data for machining a curved surface according to the invention.

Numeral 101 denotes a three-dimensional curved surface to be machined, 102 a curved boundary surface specifying the cutting limits of the curved surface 101, 103 an X-Y reference plane, 11i an i-th point-sequence path on the machined curved surface 101, A(i,j) a j-th point on the point-sequence path 11i, B(i,j) an offset point of a tool TL, with the point A(i,j) serving as a machining point, Q(i,j) a tool nose point, and C(i,j) a point on the curved boundary surface 102 corresponding to a projected point B'(i,j) obtained by projecting the point B(i,j) on the X-Y plane. P(i,j) represents the point of intersection between a line segment Q(i,j−1)-Q(i,j) connecting a series of points of the tool nose, and a line segment C(i,j−1)C(i,j) connecting projected points on the curved boundary surface 102 corresponding to the abovementioned series of points of the tool nose.

In the present invention, the first step is to enter data specifying the first three-dimensional curved surface desired to be machined as well as data specifying the second three-dimensional curved surface 102 which provides the cutting boundary of the first three-dimensional curved surface in the depth direction, and to define the first machined surface 101 and the second curved boundary surface 102 by respective sets of a plurality of point-sequence paths on these curved surfaces. The method of determining a plurality of point sequences on a curved surface from curved surface data is well known. For example, such a method is disclosed in the specifications of U.S. Pat. No. 4,569,014 and U.S. Pat. No. 4,589,062.

Next, the following are determined: the tool offset point sequence B(i,j) corresponding to the point sequence A(i,j) on the machining curved surface 101, the point sequence Q(i,j) of the tool nose, the projected point sequence B'(i,j) obtained by projecting the tool nose point sequence onto the X-Y plane 103, and the projected point sequence C(i,j) obtained by projecting the abovementioned projected point sequence onto the curved boundary surface 102.

Thereafter, a check is performed to see whether the line segment Q(i,j−1)Q(i,j) connecting the tool nose point sequence and the line segment C(i,j−1)Q(i,j) connecting the projected point sequence on the curved boundary surface 102. If the line segments intersect, a tool offset line segment up to the point of intersection P(i,j) is outputted and NC data are created. This is followed by a pick-feed and NC data creation performed in the same manner.

Figure 2:
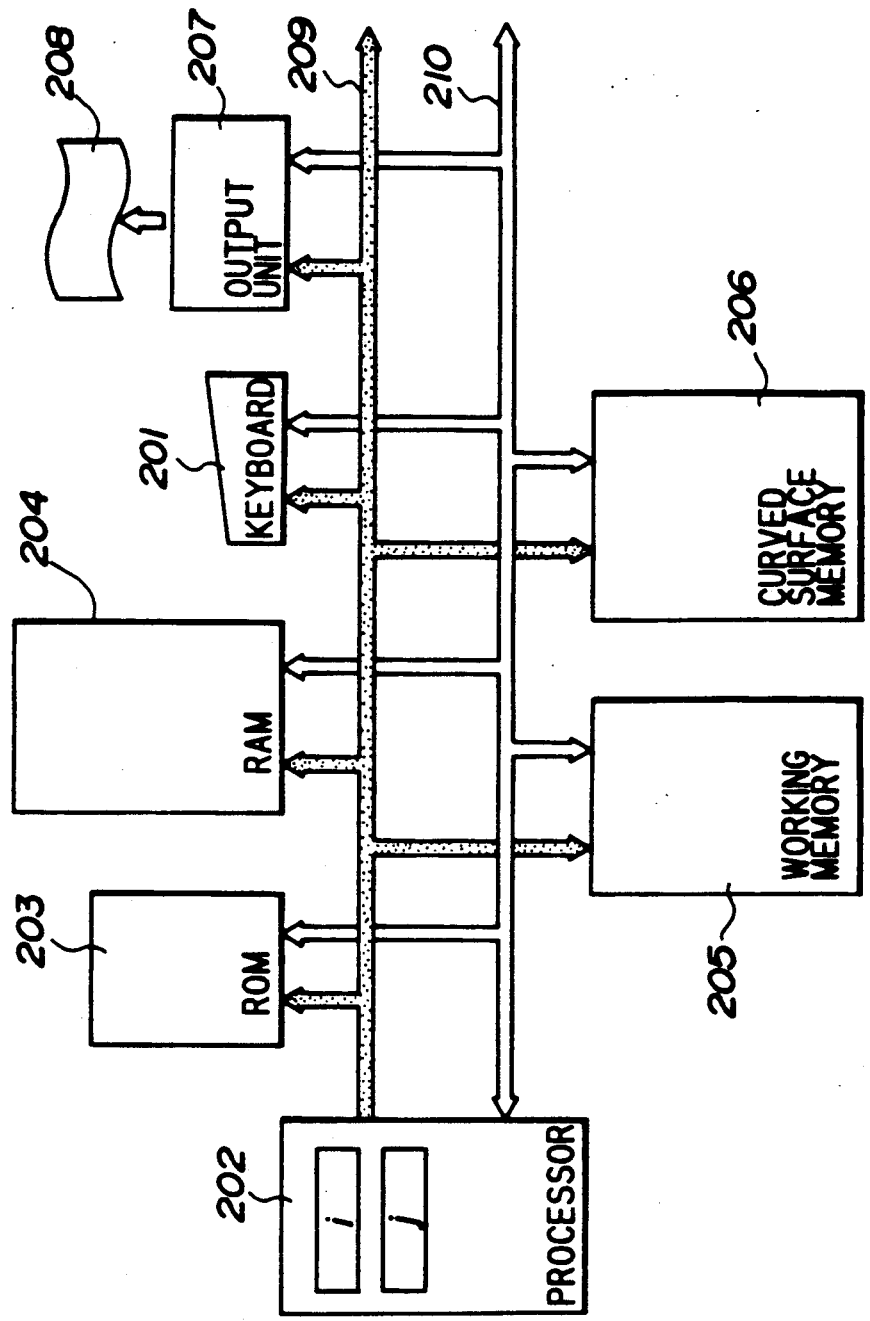
FIG. 2 is a block diagram of an NC data creating apparatus according to the present invention.
Figure 3:
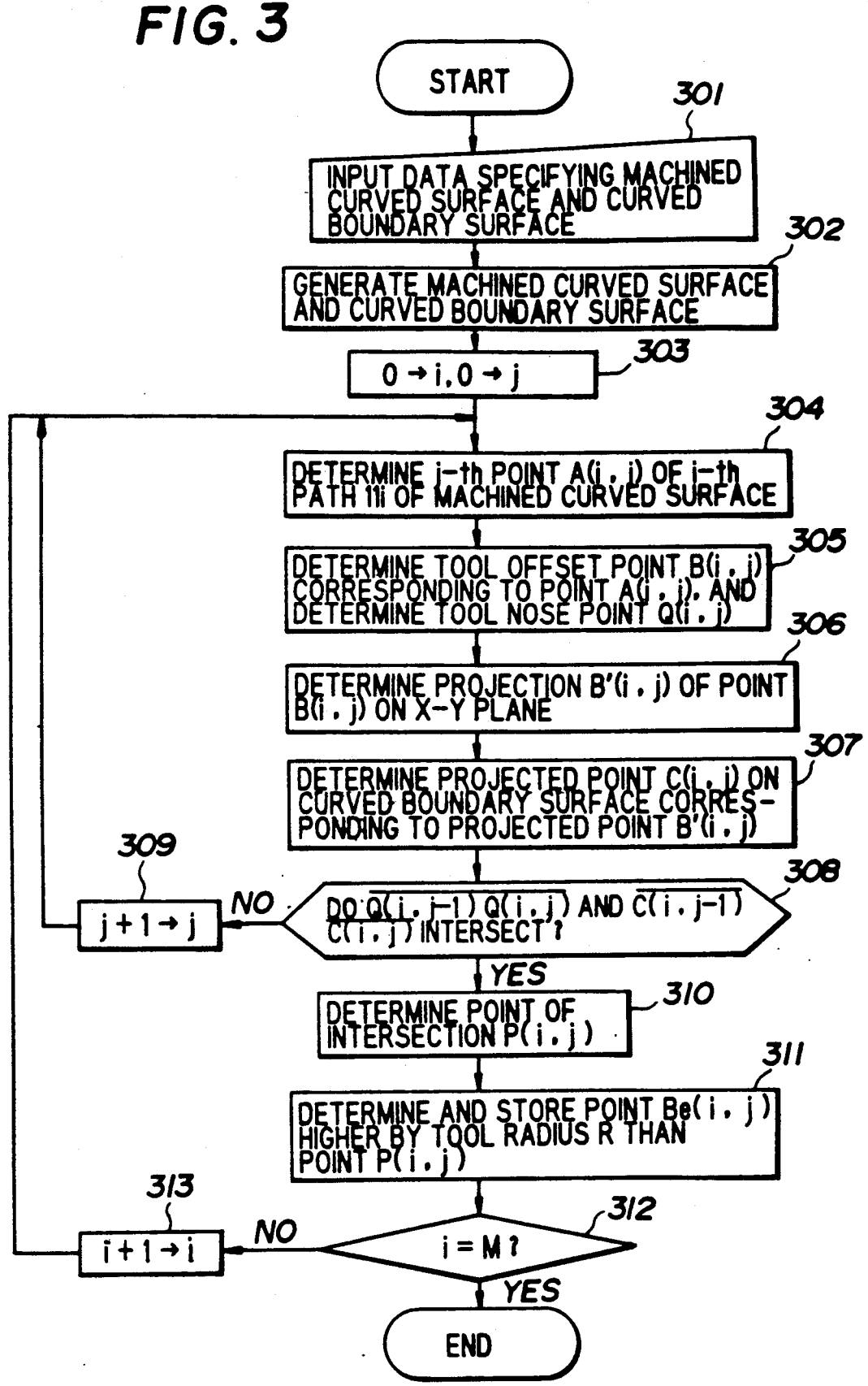
FIG. 3 is a flowchart of processing according to the invention.

FIG. 2 is a block diagram of an NC data creating apparatus capable of practicing the present invention, and FIG. 3 is a flowchart of processing according to the invention. In FIG. 2, numeral 201 denotes a keyboard for data input; 202 a processor; 203 a ROM storing a control program for creating NC data; 204 a RAM; 205 a working memory; 206 a curved surface memory for storing generated curved surface data, 207 an output unit for outputting generated curved surface data to an external storage medium 208 such as a paper tape or magnetic tape; 209 an address bus; and 210 a data bus.

The method of creating NC data for machining a curved surface in accordance with the invention will now be described in detail with reference to the flowchart of FIG. 3.

Figure 4:
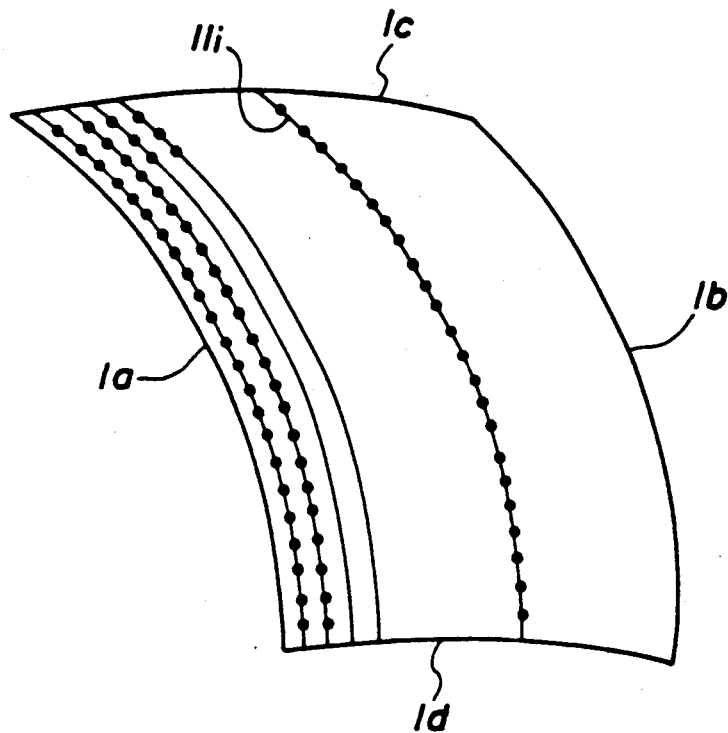
FIG. 4 is a view for describing point-sequence paths on a curved surface.

First, data specifying the first three-dimensional curved surface 101 (FIG. 1) desired to be machined as well as data specifying the second three-dimensional curved surface (curved boundary surface) 102 which provides the cutting boundary of the first three-dimensional curved surface in the depth direction are entered from the keyboard 201. These entered data are stored in the RAM 204. It should be noted that the three-dimensional curved surfaces are specified by drive curves 1a, 1b and base curves 1c, 1d, as shown in FIG. 4. Accordingly, these curve data are entered (step 301).

When the data for specifying the curved surfaces have been entered, the procesor 202 generates the first machining curved surface 101 and the second curved boundary surface 102 in accordance with the well-known technique disclosed in the abovementioned U.S. Patent specifications. In curved surface generation processing, an intermediate section curve 11i (i=0, 1, 2, ... M; see FIG. 4), which is a point-sequence path, is generated, and a curved surface is generated by a set of these intermediate section curves (step 302).

Next, the processor 202 performs the operations $$0 \to i, 0 \to j$$

(step 303), and a j-th point A(i,j) of an i-th path 11i on the machining curved surface 101 is determined (step 304).

Figure 5:
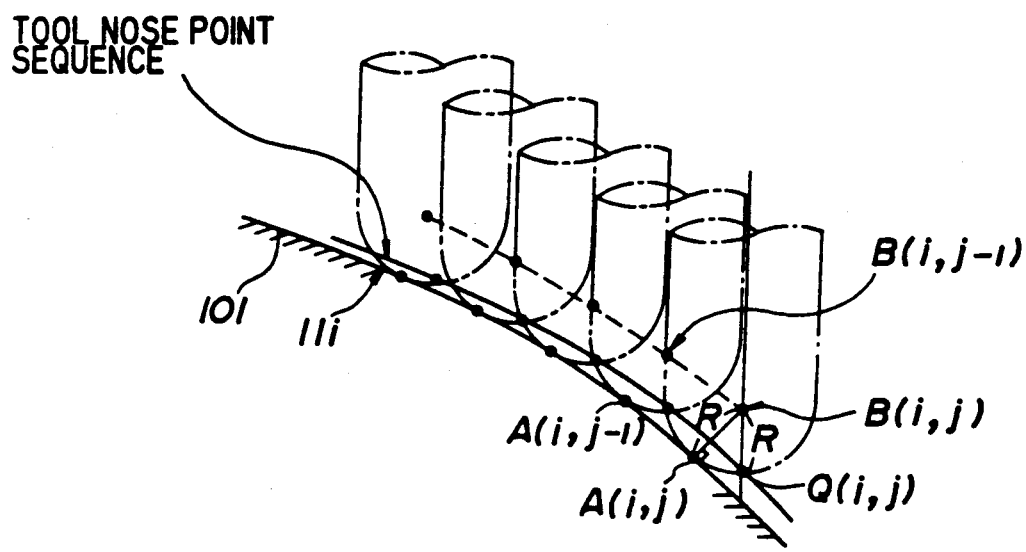
FIG. 5 is a view showing the relationship among a point-sequence path, the center of a tool and the tool nose.
Figure 6:
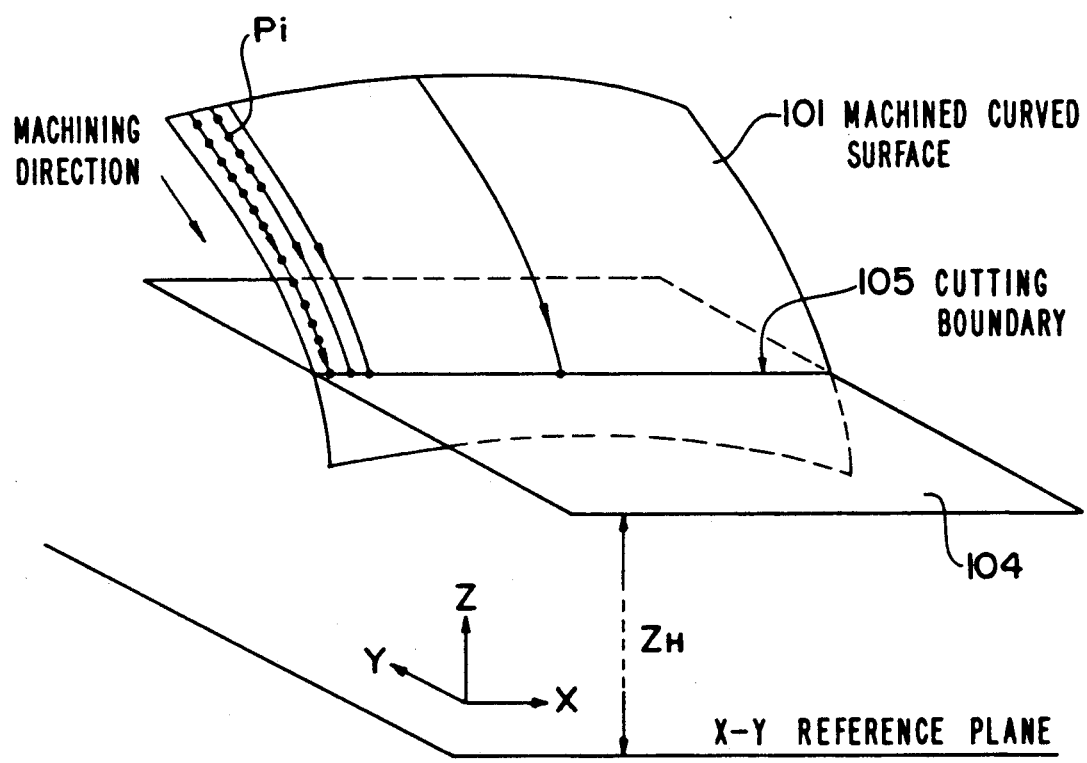
FIG. 6 is a view for describing an example of the prior art.
Figure 7:
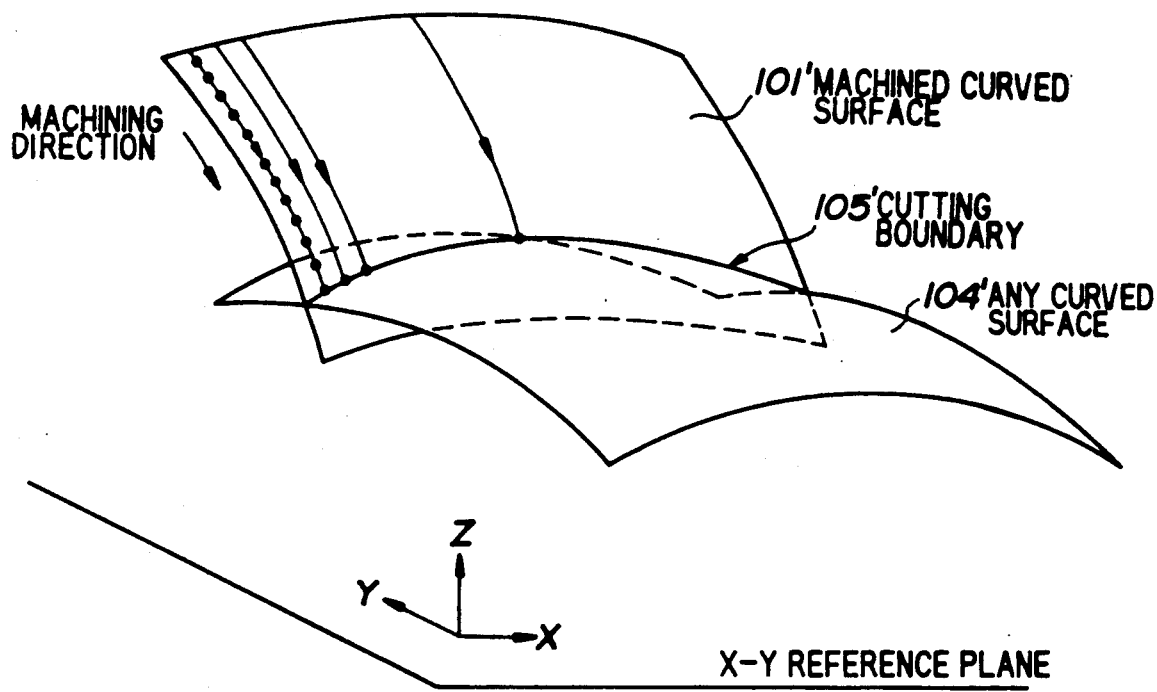
FIG. 7 is a view for describing that machining along a curved boundary line is impossible with the prior-art method.

When the point A(i,j) has been found, a normal line to the path 11i is erected at the point A(i,j); the center (offset point) B(i,j) of the tool, offset by the tool radius R is found; and the tool nose point Q(i,j) is determined (step 305; see FIG. 5). A method of determining the normal line direction is well known and disclosed in the specification of U.S. Pat. No. 4,559,601.

Determined next is the projected point B'(i,j) obtained by dropping the tool offset point B(i,j) or the tool nose point Q(i,j) perpendicularly onto the X-Y plane (step 306).

When the projected point B'(i,j) on the X-Y plane has been obtained, this projected point is elevated perpendicularly to obtain the projected point C(i,j) on the curved boundary surface 102 (step 307). A method of obtaining a projected point on a curved surface is well known. For example, this method is disclosed in International Laid-Open No. WO86/05289 (Title: "Complex Curved Surface Creation Method"; Laid-Open Date: Sept. 12, 1986).

Thereafter, it is checked to see if the line segment Q(i,j−1)Q(i,j) connecting the tool nose point sequence and the line segment C(i,j−1)Q(i,j) connecting the projected point sequence on the curved boundary surface 102 intersect (step 308). If the line segments do not intersect, the processor 202 stores the point B(i,j) in the curved surface memory 206, performs the operation $$j+1 \to j$$

to increment j, and repeats processing from step 304 onward (step 309).

If these line segments do intersect, on the other hand, the point of intersection P(i,j) is obtained (step 310).

The processor 202 determines an offset point $B_e(i,j)$, which is higher by the tool radius R in the Z direction than the point of intersection P(i,j), and stores the offset point $B_e(i,j)$ in the curved surface memory 206 (step 311).

Next, it is determined whether i=M holds (step 312). Note that the M-th point-sequence path is the final point-sequence path.

If i≠M is found to hold, the processor 202 performs the operation $$i+1 \to i$$

to increment i and then repeats processing from step 304 onward (step 313).

If i=M is found to hold in the determination of step 312, processing is terminated. This is followed by creating NC data for curved surface machining using the point sequence data stored in the curved surface memory 206, and outputting the NC data to the external storage medium 208 via the output unit 207.

Thus, in accordance with the present invention, it is arranged to create NC data by designating a cutting boundary in the depth direction by any curved surface and outputting machining points up to the cutting boundary. This makes it possible to machine parts, such as TV frames, in which the boundary in the depth direction varies three-dimensionally.

We claim:

1. A method of automatically creating NC data in an NC data creating apparatus and machining a curved surface, comprising:
   a first step of inputting data specifying a first three-dimensional surface and data specifying a second three-dimensional surface that defines a cutting boundary in a depth direction of said first three-dimensional surface;
   a second step of generating a first plurality of point-sequence paths defining said first three-dimensional surface and generating a second plurality of point-sequence paths that define said second three-dimensional surface;
   a third step of determining a tool nose point sequence corresponding to a point sequence on said first curved surface based on said first plurality of point-sequence paths;

a fourth step of determining a projected point sequence obtained by projecting said tool nose point sequence onto a reference plane, and determining a projected point sequence on said second curved surface obtained by projecting said first-mentioned point sequence onto said second curved surface;

a fifth step of checking if a line segment connecting the tool nose point sequence and a line segment connecting the projected point sequence on said second curved surface intersect and if they do intersect, determining a point of intersection $P(i,j)$;

a sixth step of creating NC data up to a point of said intersection $P(i,j)$ if the line segments intersect; and a seventh step of subsequently machining a curved surface by performing a pick-feed using the NC data.

2. A method of automatically creating NC data according to claim 1, wherein said third step includes the substeps of:

determining a line normal to one of said first plurality of point-sequence paths at a point on said one of said first plurality of point-sequence paths;

determining a tool center offset point $B(i,j)$ along said line based on a tool radius R;

determining a point underlying the tool center offset by the tool radius R, and adopting this point as the tool nose.

3. A method of automatically creating NC data according to claim 2, wherein the apparatus has a Z direction and said sixth step includes the substeps of:

determining a point $B_e(i,j)$ above the point of intersection $P(i,j)$ in the Z direction by a distance corresponding to the tool radius;

outputting the tool center offset point $B(i,j)$; and outputting the point $B_e(i,j)$.

* * * * *